(12) United States Patent
Heebner et al.

(10) Patent No.: US 12,246,270 B2
(45) Date of Patent: Mar. 11, 2025

(54) BIOBASED DEFOAMER COMPOSITIONS AND METHODS OF PREPARATION THEREOF

(71) Applicant: Kraton Chemical, LLC, Jacksonville, FL (US)

(72) Inventors: Gerry Heebner, Savannah, GA (US); Michael Bulanov, Almere (NL); Patrick van Waes, Almere (NL); Bert Krutzer, Almere (NL)

(73) Assignee: Kraton Chemical, LLC, Jacksonville, FL (US)

( * ) Notice: Subject to any disclaimer, the term of this patent is extended or adjusted under 35 U.S.C. 154(b) by 68 days.

(21) Appl. No.: 17/823,553

(22) Filed: Aug. 31, 2022

(65) Prior Publication Data

US 2024/0066436 A1      Feb. 29, 2024

Related U.S. Application Data

(60) Provisional application No. 63/260,996, filed on Sep. 8, 2021.

(51) Int. Cl.
*B01D 19/04* (2006.01)

(52) U.S. Cl.
CPC ..... *B01D 19/0413* (2013.01); *B01D 19/0422* (2013.01)

(58) Field of Classification Search
CPC .......................................... B01D 19/04–0495
See application file for complete search history.

(56) References Cited

U.S. PATENT DOCUMENTS

| 4,123,383 A | 10/1978 | Ihde |
| 2006/0041027 A1* | 2/2006 | Heebner ............ B01D 19/0413 516/115 |
| 2006/0052462 A1 | 3/2006 | Heebner |

FOREIGN PATENT DOCUMENTS

| CA | 2232395 A1 | 3/1997 |
| EP | 4015603 A1 | 6/2022 |
| JP | 09235408 A * | 9/1997 |

OTHER PUBLICATIONS

Machine Translation of JPH09-235408A. Sep. 9, 1997 (Year: 1997).*

* cited by examiner

*Primary Examiner* — Stephen E Rieth

(57) ABSTRACT

A method of defoaming a system subject to foaming by using a defoamer composition is disclosed. The defoamer composition contains (a) 80 to 100 wt. % of a decarboxylated rosin acid (DCR) having a density of 0.9 to 1.0 g/cm³, a flash point of 135 to 175° C., an acid value of <50 mg KOH/g, measured according to ASTM D465, and a viscosity of 15 to 60 cSt at 40° C., measured according to ASTM D-445; and (b) 0 to 20 wt. % based on total weight of the defoamer composition of at least one component selected from the group consisting of nanoparticles, surfactants, hydrophobic compounds, and mixtures thereof. The defoamer composition is very effective in controlling unwanted foam formation or reduce already formed foam in the system.

20 Claims, 1 Drawing Sheet

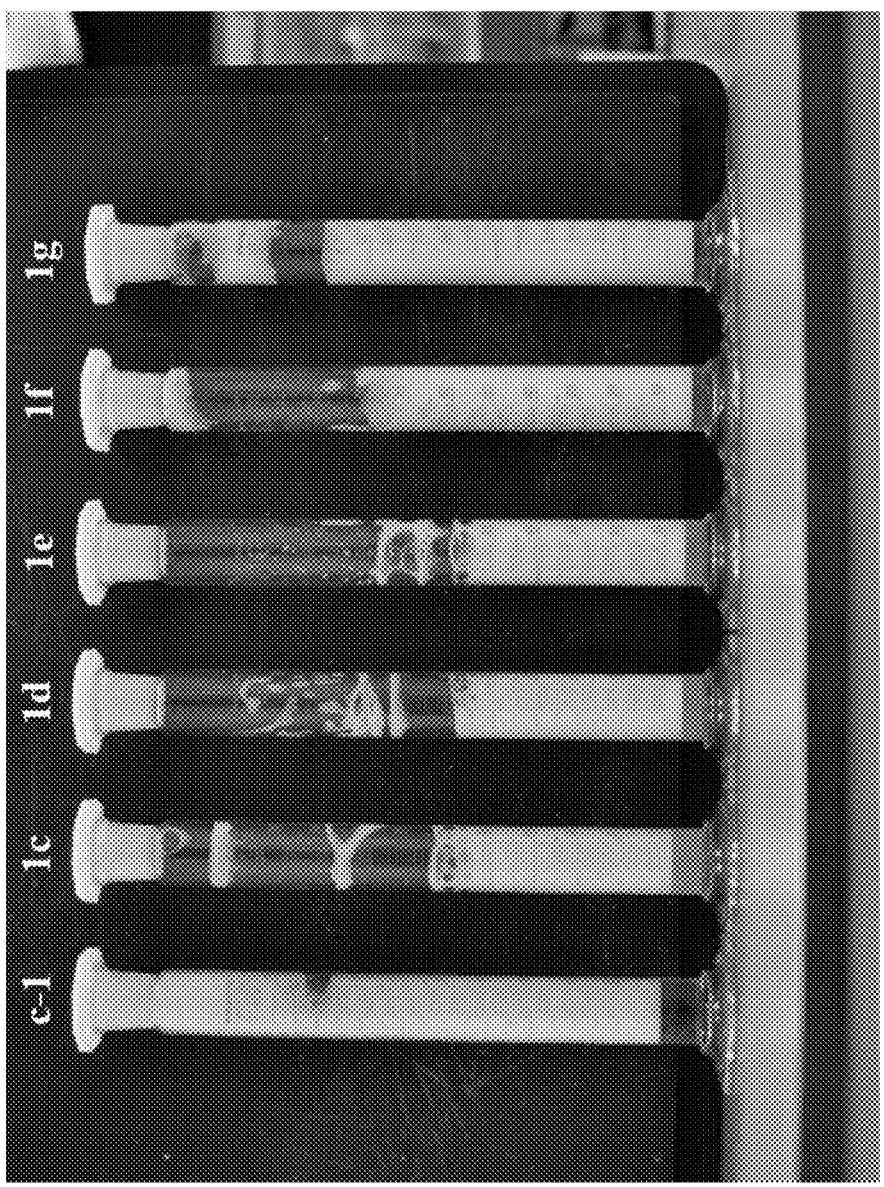

BIOBASED DEFOAMER COMPOSITIONS AND METHODS OF PREPARATION THEREOF

RELATED APPLICATIONS

This application claims benefit to U.S. provisional application No. 63/260,996, filed on Sep. 8, 2021, which is hereby incorporated herein by reference.

FIELD

The disclosure relates to a method of defoaming a system subject to foaming by using a defoamer composition, methods of preparation, and applications thereof.

BACKGROUND

Many industrial formulations require foam free system in various applications. By having foam in such formulations can impact end use products, e.g., defects, inefficient use of containers, low density products, etc. It is desirable to control unwanted foam from formulations using suitable additives. However, the choice of foam control additives needs to have certain properties including the ability to reduce an already formed foam in a short period of time, inhibit formation of foam over an extended period, not to interact with other components, not to affect properties of the formulation, or possess sufficient shelf stability, etc.

Besides affecting product quality, foam problem is also experienced in industrial operations, e.g., polymerizations, paints, papermaking processes, oil drilling and refining operations, food preparation, textile dyeing operations, etc. Foam formation in liquid coolants, hydraulic fluids, lubricants, aviation fuels, and gas absorption systems can cause undesirable results under operating conditions. If not properly controlled, foam can reduce equipment capacity and increase processing time and expense, and in some instances, cause other damages.

Commonly known defoamers are based on petroleum sources. Rosin is a natural raw material which can be modified to obtain useful products. It is desirable to have defoamer compositions that are biobased, and which are effective in controlling unwanted foam formation or reduce already formed foam in the system.

SUMMARY

In one aspect, the disclosure relates to a method of defoaming a system subject to foaming comprising, consisting essentially of, or consists of treating the system with 0.001 to 10 wt. % of a defoamer composition, based on total weight of the system. The defoamer composition comprises: 80 to 100 wt. % of a decarboxylated rosin acid (DCR) having a density of 0.9 to 1.0 g/cm$^3$, a flash point of 135 to 175° C., an acid value of <50 mg KOH/g, measured according to ASTM D465, and a viscosity of 15 to 60 cSt at 40° C., measured according to ASTM D-445; and (b) 0 to 20 wt. % based on total weight of the defoamer composition of at least one component selected from the group consisting of nanoparticles, surfactants, hydrophobic compounds, and mixtures thereof. The defoamer composition reduces a foam content by at least 20 volume % relative to the system without the defoamer composition.

In a second aspect, the DCR comprises: one or more C=C groups; and 40 to 100 wt. % of tricyclic compounds having 18 to 20 carbon atoms, based on total weight of the DCR.

In a third aspect, sum of tricyclic compounds as aromatic and cycloaliphatic in the DCR is >50 wt. %, based on total weight of the DCR.

In a fourth aspect, an amount of the tricyclic cycloaliphatic compound in the DCR is >15 wt. %, based on total weight of the DCR.

DRAWINGS

FIG. 1 shows a photograph of tubes containing foaming system with and without addition of the defoamer composition.

DESCRIPTION

The following terms will be used throughout the specification.

"Foam" refers to a dispersion of gas (usually) air in a liquid or a solid.

"Foaming system" or "system subject to foaming" refers to compositions or media or medium or homogenous/heterogeneous mixtures of ingredients in a liquid form having foam and/or produce foam. It is an undesirable side effect that can occur during manufacturing, filling, or packaging as well as during the application of e.g., paints/coatings.

"Defoamer composition," or "anti-foaming agent" or "air release agent" refers to a product designed to destroy foam after it has been formed (post-defoaming), prevent foam formation (pre-defoaming), or removes (micro-) air bubbles from a liquid and helps them to rise to the surface.

"Solubility Parameter" or ($\delta$) of a solvent or polymer, refers to the square root of the vaporization energy ($\Delta E$) divided by its molar volume (V), as in the equation $\delta = (\Delta E/V)^{1/2}$. The more similar the solubility parameters of two substances, the higher will be the solubility between them and hence the expression "like dissolves like." Hansen established that the solubility parameter of a solvent or polymer is the result of the contribution of three types of interactions: dispersion forces ($\delta_D^2$), polar interactions ($\delta_P^2$) and hydrogen bonds ($\delta_H^2$) (Hansen, 2007; Hansen, 1967), with the total solubility (Hildebrand) parameter $\delta T$ as the result of contribution of each of the three Hansen solubility parameters (HSP) according to: $\delta_T = (\delta_D^2 + \delta_P^2 + \delta_H^2)^{1/2}$.

The disclosure relates to a method of defoaming a system subject to foaming, comprising treating the system with a defoamer composition containing (a) a decarboxylated rosin acid (DCR), and (b) an optional component selected from the group consisting of nanoparticles, surfactants, hydrophobic compounds, and mixtures thereof.

Decarboxylated Rosin Acid (DCR): The DCR is a rosin-derived composition obtained by decarboxylating a rosin acid, or by dimerizing and decarboxylating a rosin acid and separating/removing the dimerized species. The DCR is in the form of a liquid, and can be any of a crude DCR, a distilled or purified DCR, or mixtures thereof. The DCR can be hydrogenated and/or functionalized. Crude DCR is DCR containing 5-25 wt. % of higher molecular weight (450-1500 Da) components, e.g., hydrocarbons, oligomers, polymers, impurities, or dimer/trimer of fatty acids. Distilled or purified DCR refers to crude DCR having heavy fractions removed to improve color, reduce sulfur, etc.

DCR is produced by the decomposition of rosin acids at high temperatures, e.g., 220-300° C. Rosin acids are normally solid, having a softening point of, e.g., 65-85° C. The rosin acid can be fully decarboxylated forming DCR. The rosin acid can be partially decarboxylated, forming DCR, which is a mixture of molecules, some of which contain monocarboxylic acids having a general molecular formula, e.g., $C_{20}H_{30}O_2$.

In embodiments, the DCR comprises one or more C=C groups, 40-100 wt. % of tricyclic compounds having 18-20 carbon atoms, 0-30 wt. % of components with <19 carbon atoms, and 40-100 wt. % of components with a molecular formula in the range from $C_{19}H_{20}$ to $C_{19}H_{34}$, based on total weight of the DCR.

In embodiments, the DCR is characterized as having a m/z (mass/charge) value in the range of 220-280, or 230-270, or 234-262, or 235-265, or >230, or <265, measured by GC-FID-MS.

In embodiments, the DCR is characterized as having an oxygen content of <5%, or <3%, or <2%, or 0-1%. The oxygen content (in %) can be calculated as oxygen to carbon ratio, or the sum of oxygen atoms present divided by the sum of carbon atoms present, with the number of oxygen and carbon atoms being obtained from elemental analyses.

In embodiments, sum of tricyclic compounds as aromatic and cycloaliphatic in the DCR is >50, or >55, or >60, or >74, or >90, or up to 100 wt. %, of total weight of the DCR. Aromatic DCR is defined as DCR species having a MW of 252-256 g/mol, with MW of 254 g/mol as having a reactive double bond, and cycloaliphatic DCR is defined as DCR species having a MW of 260 or 262 g/mol.

In embodiments, an amount of the tricyclic cycloaliphatic compound is >15, or >20, or >30, or >40, or >50, or >80 wt. %, based on total weight of the DCR.

In embodiments, the total amount of tricyclic compounds having reactive double bond (C=C group) is 1-45, or <40, or <30, or <20, or <15, or <10 wt. % of total weight of the DCR. Reactive C=C group is defined as DCR species having a MW of 254 or 258 g/mol.

In embodiments, the DCR is characterized as having a lower acid value (carboxylic acid content) than the rosin acid feedstock for making the DCR. In embodiments, the DCR has an acid value of <50, or <45, or <40, or <35, or <30, or <25, or <20, or <15, or <10, or <7, or <5, or 0.5-40, or 0.5-30, or 0.5-20, or 1-20, or 1-15, or 1-15, 1-10 mg/KOH, as measured using ASTM D1240-14 (2018) or ASTM D465.

In embodiments, the DCR has a density of 0.9-1.0, or 0.91-0.99, or 0.92-0.98, or 0.93-0.97, or 0.94-0.96, or >0.9, or <1.1 g/cm³.

In embodiments, the DCR is characterized as having viscosities comparable to those of petrochemical base oils, due in part to its relatively high molecular weights, for example, a viscosity at 40° C. of 15-60, 18-55, 20-50, or 22-48, or 25-45, or 28-42, or 30-40, or >20, or >25, or >28, or <45, or <50 cSt, measured according to ASTM D-445.

In embodiments, the DCR has an aniline point of 3-40° C., or 5-40° C., or 5-30° C., or 5-25° C., or 2-20° C., or 5-20° C., or 5-15° C., or <25° C., or <20° C., or >3° C., or >5° C., or >8° C., measured according to ASTM D611.

In embodiments, the DCR has a pour point of −40 to +10° C., or −35 to +8° C., −30 to +5° C., or −30 to +0° C., or −30 to −5° C., or −28 to 0° C. or −28 to −5° C., or −28 to −10° C., or >−30° C., or >−28° C., or <+5° C., measured according to ASTM D97.

In embodiments, the DCR has a flash point of 135-175° C., 135-165° C., or 135-160° C., or 140-175° C., or 140-160° C., or 140-158° C., or 140-155° C., or >135° C., or >140° C., or <175° C., or <165° C., or <160° C., measured according to ASTM D92.

In embodiments, the DCR has a boiling point of 200-390° C., or 210-390° C., or 235-390° C., 280-380° C., or 290-370° C., 300-360° C., or >290° C., or >230° C., >210° C., or <400° C., or <370° C., measured according to D2887.

In embodiments, the DCR has a Gardner Color of 0-12.0, or 0.5-12.0, or 0.8-12.0, or 0.9-11, or 1.0-10.0, or 1.0-6.0, or 1.0-5, or >0, or >1.0, or >1.2, or <10.0, or <7.0, or <6.0, or <5.0, or <2.4, or <3.0, measured according to ASTM D6166.

In embodiments, the DCR has a sulfur content of <500 ppm (0.05 wt. %), or <300 ppm (0.03 wt. %), or <200 ppm (0.02 wt. %), or <100 ppm (0.01 wt. %), or <10 ppm (0.001 wt. %), or 20-700 ppm (0.002-0.7 wt. %), 30-500 ppm (0.003-0.5 wt. %), or 40-400 ppm (0.004-0.4 wt. %), or 40-300 ppm (0.004-0.3 wt. %), or 40-200 ppm (0.004-0.2 wt. %), based on total weight of the DCR, measured according to ASTM D5453.

In embodiments, the DCR has a VOC of <5, or <4.75, or <4.5, or <4.25, or <4.0, or <3.75, or <3.5, or <3.25, or <3.0, or <2.75, or <2.5, or <2.25, or <2.0, or <1.5, or <1.0, or <0.5 wt. %, based on total weight of the DCR. The VOC of the DCR is measured according to methods: i) summing the percent by weight contribution from all VOCs present in the product at 0.01% or more, or ii) according to the EPA (Environmental Protection Agency) method 24 or equivalent.

In embodiments, the DCR has a Kb (Kauri butanol) value of 25-90, or 30-85, or 35-80, or 40-75, or 45-70, or 50-65, or >40, or >50, or >60, or >70, or >80, measured according to ASTM D1133.

In embodiments, the DCR has a viscosity index of <−100, or <−110, or <−115, or <−120, measured according to ASTM D2270. The viscosity index is an arbitrary, unit-less measure of a fluid's change in viscosity relative to temperature change, for example, index of viscosity at 40° C. and viscosity at 100° C.

In embodiments, the DCR has a $\delta_D$ value of 14-18, or 14.2-17.8, or 14.5-17.5, or 15-17, or 15.2-16.5; a δD value of 3-6, or 3.2-5.5, or 3.4-5.2, or 3.5-5.0; and 6H value of 7-10, or 7.5-9.5, or 8-9, or 8.2-8.8.

In embodiments, the DCR has a surface tension of 25-50, or 28-45, or 30-40 dynes/cm, measured according to ASTM D1331.

In embodiments, the defoamer composition includes the DCR in an amount of 80-100, or 85-99.95, or 90-99.90, or 90-99.80, or 90-99, or 90-95 wt. %, based on total weight of the defoamer composition.

Optional Component: In embodiments, the defoamer composition comprises at least one component selected from the group consisting of nanoparticles, surfactants, hydrophobic compounds, and mixtures thereof, in an amount of up to 20 wt. %, or 0-20, or 0.5-15, or 0.1-10, or 1-10, or 5-10 wt. %, based on total weight of the defoamer composition.

Nanoparticles: In embodiments, the optional component comprises nanoparticles based on silica derived from a silicate, such as an alkali metal silicate or ammonium silicate. Herein, "silica nanoparticles" refer to nanoparticles that include only silica as well as to core-shell nanoparticles with a surface that includes silica. Other non-limiting examples of silica include aerogel silica, silica xerogels, fumed silica, precipitated silica, and mixtures thereof. Silica can be functionalized with silanes or any other functional groups. In embodiments, the defoamer composition comprises other nanoparticles such as zirconium dioxide, aluminum oxide, cerium oxide, tin oxide, titanium dioxide, and mixtures thereof. In embodiments, an average particle size of nanoparticles is in the range of 0.01-2 μm, or 0.05-1 μm, or 0.1-0.5 μm, or 0.01-0.5 μm.

Surfactants: In embodiments, the optional component is at least a surfactant selected from the group consisting of non-ionic surfactants, anionic surfactants, cationic surfactants, amphoteric surfactants, and mixtures thereof. Examples of non-ionic surfactants include polyoxyethylenelauryl alcohol, polyoxyethylene lauryl ether, polyoxyethylene oleyl ether and other polyoxyethylene higher alcohol ethers, polyoxyethylene octyl phenol, polyoxyethylene nonyl phenol and other polyoxyethylene alkylaryl ethers, polyoxyethylene glycol monostearate and other polyoxyethylene acyl esters, polyoxyethylene stearate, polypropylene glycol ethylene oxide adduct, polyoxyethylene sorbitan monolaurate, sorbitane monostearate, and other polyoxyethylene sorbitan fatty acid esters, alkyl phosphate ester, polyoxyethylene alkyl ether phosphate ester and other phosphate esters, sugar esters and cellulose esters, and mixtures thereof.

Examples of anionic surfactants include sodium oleate, potassium oleate and other fatty acid salts, sodium lauryl sulfate, ammonium lauryl sulfate and other higher alcohol sulfate esters, dodecylbenzene sodium sulfonate, sodium alkyl naphthalene sulfonate and other alkylbenzene sulfonic acid salts and alkyl naphthalene sulfonic acid salts, bis(2-ethylhexyl) sulfosuccinate sodium (AOT), condensed formalin naphthalene sulfonate, dialkyl sulfo succinate salts, dialkyl phosphate salts, sodium polyoxyethylene alkyl phenyl ether sulfate and other polyoxyethylene sulfate salts, and mixtures thereof.

Examples of cationic surfactants include ethanolamines, laurylamine acetate, triethanolamine monoformate, cetyl trimethylammonium bromide (CTAB), stearamide ethyl diethylamine acetate and other amine salts, lauryl trimethyl ammonium chloride, stearyl trimethyl ammonium chloride, dilauryl dimethyl ammonium chloride, distearyl dimethyl ammonium chloride, lauryl dimethylbenzyl ammonium chloride, stearyl dimethylbenzyl ammonium chloride and other quaternary ammonium salts, and mixtures thereof.

Examples of amphoteric surfactants include dimethylalkyl lauryl betaine, dimethyl alkyl stearyl betaine and other fatty acid-based amphoteric surfactants, dimethyl alkyl sulfobetaine and other sulfonic acid-based amphoteric surfactants, and alkyl glycine, and mixtures thereof.

Hydrophobic Compounds: In embodiments, the optional component is a hydrophobic compound selected from but not limited to polyethylene wax, carnauba wax, spermaceti, beeswax, lanolin, vaseline, microcrystalline wax, ceresin, squalene, pristan, polyglycerol fatty acid ester, $C_{14}$ to $C_{22}$ alkyl polypentoside, hydrophobic clay, diisopropyl sebacate, octyl isononanoate, isodecyl octanoate, diethylene glycol, isopropyl myristate, isocetyl palmitate, isopropyl isostearate, isocetyl palmitate, isostearyl palmitate, diisostearyl malate, diglyceryl isostearate, diisopropyl dimerate, diglyceryl diisostearate, polyamide particles, silicone oil, and mixtures thereof.

In embodiments, the silicone oil includes but is not limited to polymethyl hydrogen siloxane, amino silicone oil, fluorosilicone oil, phenyl methyl silicone oil, vinyl silicone oil, hydrogen silicone oil, alkoxylated dimethylpolysiloxane, alkyl modified siloxanes, mercapto modified siloxanes, hydroxy modified siloxanes, and mixtures thereof.

Optional Carrier Fluid/Diluent: In embodiments, the defoamer composition further comprises a carrier fluid, diluent, or medium to help improve/increase diffusion ability into the foaming system. In embodiments, the carrier fluid is an inert material that will enhance or at least not interfere, with the DCR in the defoamer composition. Non-limiting examples of a carrier fluid include, mineral oil, vegetable oil, white oil, paraffin oil, polyglycols, polyalkoxylate esters, fuel oil, naphthenic oil, fatty acids, organic solvents, water, sulfonated tall oil, and mixtures thereof.

In embodiments, the carrier fluid is in a liquid form that will remain liquid over a wide temperature range for the type of defoamer composition.

In embodiments, the carrier fluid is added in amounts of 0-90, or 5-80, or 10-70, or 1-50, or 5-50, or 1-20, or 5-30 wt. %, based on total weight of the defoamer composition.

Optional Additives: In embodiments, the defoamer composition further comprises at least one additive selected from the group consisting of wax, metallic soaps, unsaponifiable material, freezing point suppressant, cloud point suppressant, diluents, stabilizers, rheology modifiers, metal stearates, biocides, preservatives, extreme pressure (EP) additives, anti-wear additives, corrosion inhibitors, metal deactivators, deodorants, anti-oxidants, dyes, viscosifiers, polymers, resins, plasticizers, redox couples, fillers, fibers, flame retardants, deaerators, pigments, colorants, flow modifiers, drip retardants, anti-blocking agents, anti-static agents, anti-microbial agents, processing aids, pH control agents, thickening agents, binders, polyacrylate-based surface additive, and mixtures thereof.

In embodiments, the freezing and/or cloud point suppressant are selected from glycols, e.g., polyethylene glycol (PEG), propylene glycol, ethylene glycol, and mixtures thereof.

In embodiments, the pH control agent is selected from potassium chloride, potassium acetate, potassium carbonate, potassium lignite, potassium hydroxide, potassium salt of partially hydrolyzed polyacrylamide (PHPA), and mixtures thereof. Other salts can also be added, e.g., dissolved sodium chloride, calcium chloride, sodium hydroxide, calcium oxide, calcium hydroxide, magnesium oxide, sodium carbonate, and the like.

In embodiments, polymers include polyalkyl vinyl ether copolymers, polyamides, vinylacetate/vinylester copolymers, hydroxyethyl cellulose, ammonium polyacrylate, polysiloxane having a plurality of siloxane groups and at least one tertiary amide group, polyesters, branched-polyesters, hyperbranched polyethylenes, epoxidized ethylene polymers, and mixtures thereof.

In embodiments, optional additives are present in amounts of 0-20, or 0.01-15, or 0.1-10, or 1-5 wt. %, based on total weight of the defoamer composition.

Defoamer Composition: In embodiments, the defoamer composition comprises 80-100 wt. % of DCR, and up to 20 wt. % of at least one optional component; alternatively, 90-99.90 wt. % of DCR, and 0.1-10 wt. % of optional component; alternatively, 80-99.90 wt. % of DCR, 0.1-20 wt. % of optional component(s), based on total weight of the defoamer composition; alternatively, 80-99.80 wt. % of DCR, 0.1-10 wt. % of nanoparticles, and 0.1-10 wt. % of surfactant(s), based on total weight of the defoamer composition.

Method of Preparation: The defoamer composition can be in aqueous or non-aqueous liquid form, as a continuous phase or a discontinuous phase, e.g., as suspension, dispersion, emulsion, solution, or sol. The composition can be prepared by known methods, e.g., mixing all components by simple stirring or with static mixers, or by employing high shearing forces in colloid mills, dissolvers, rotor-stator homogenizers, and the like.

Properties of Defoamer Composition: The defoamer composition exhibits excellent defoaming characteristics, e.g., eliminating the existing foam, and/or preventing the formation of further foam. In embodiments, the defoamer composition possesses long shelf life, improves diffusion ability in the foaming system, reduces surface tension of the foaming system, is compatible with various foaming system, and is easily spreadable on the foamy surface.

In embodiments, the defoamer composition has an acid value of 0-10, 0.1-10, or 0.1-9, or 0.5-8.5, or 0.75-7.5, or 1-6.5, or 1.2-6, or 1.4-5.5, or >0.2, or <6 mg KOH/g.

In embodiments, the defoamer composition in defoaming applications, reduces the foam content by >20, or >25, or >30, or >40, to >50, or >70 or >80, or up to 100 volume % of foam, relative to a foaming system without the defoamer composition.

Applications of Defoamer Composition: The composition can be used in any of aqueous and non-aqueous systems (e.g., tar distillation, petroleum processing, etc.), where foam formation should be suppressed, reduced, or avoided for processing or product finish reasons. Examples include finishing baths for textile materials, fiber suspensions in paper manufacture, paper coating compositions, paints, coatings, water-borne adhesives, inks, polymer latexes, food processing, metalworking fluids, wastewater plants, in the scrubbing of natural gas, mining industry, textiles, agriculture, medical and pharmaceutical industries, plastics recycling, cement manufacturing, or fertilizer production.

In embodiments, the defoamer composition when added into paints/coatings (e.g., waterborne, solvent-borne, etc.), helps minimize or eliminate the foam effect and improve the coating appearance. Additionally, the durability of coating can be improved due to the elimination of the foam, and the surface of the coating can have a lower propensity for dirt pickup and free of defects, e.g., craters or foam marks.

Method of Defoaming: A system subject to foaming can be treated by adding to the system 0.001-10, or 0.005-5, or 0.01-2, or 0.1-5 wt. % of the defoamer composition, based on total weight of the system. In embodiments, the defoamer composition is first added to a liquid surfactant in an amount of 0.01-5, or 0.05-4, or 0.1-2 wt. %, based on total weight of the surfactant. The surfactant is then diluted to the required amount and added to the system to minimize or prevent foam formation in the system.

In embodiments, the foaming system is heated to a temperature of 10-100° C., or 15-90° C., or 20-80° C., or 25-70° C., before or after addition of the defoamer composition.

Examples: The Following Illustrative Examples are Non-Limiting

Materials Used in Examples Include:

Silica particles (Aerosil R974) from Evonik.

Surfactants: Bis(2-ethylhexyl) sulfosuccinate sodium (AOT), cetyl trimethylammonium bromide (CTAB), polyoxyethylene stearate, and sorbitane monostearate.

Silicone oil with viscosity of 1000 cSt from Sigma Aldrich.

DCR samples are from Kraton Corporation with properties as shown in Table 1. The DCR samples also have the followings for DCR-I, DCR-II, and DCR-III respectively: % 02 of 0.39 (no value for DCR-II and DCR-III); % tricyclic compounds of 77.7, (none for DCR-II and DCR-III); % aromatic MW 252 of 14 and 12, (no value for DCR-III); reactive double bond MW 254 of 0.5, and 4, (no value for DCR-III); aromatic MW 256 of 45.3, and 29, (no value for DCR-III); reactive double bond MW 258 of 0.8, and 1, (no value for DCR-III); cycloaliphatic MW 260 of 0.3, and 10, (no value for DCR-III); cycloaliphatic MW 262 of 8 for DCR-II, (no value for DCR-I and DCR-III).

TABLE 1

Properties of DCRs

| Property | DCR-I | DCR-II | DCR-III |
|---|---|---|---|
| Acid Value (mg KOH/g) | 7.2 | 1.3 | 1.3 |
| Gardner Color | 10.5 | 5.6 | 0.9 |
| Kinematic Viscosity at 40° C. (cSt) | 47.59 | 31.83 | — |
| Kinematic Viscosity at 100° C. (cSt) | 4.68 | 3.70 | — |
| Viscosity Index | −136 | −199 | — |
| Pour Point (° C.) | −14 | −21 | — |
| Aniline Point (° C.) | — | 6 | — |
| Flash point (° C.) | 140° C. | — | 144 |
| Boiling point (° C.) | 235-360° C. | 235-360° C. | — |
| Dispersion forces (δD) | 16.4 | 15.8 | — |
| Polar interactions (δP) | 3.6 | 4.9 | — |
| Hydrogen bonds (δH) | 8.5 | 8.5 | — |
| Density at 20° C. (g/cm$^3$) | 0.9630 | 0.9655 | — |
| Surface Tension (dynes/cm) | 34.46 | 34.35 | — |
| Sulfur content (wt. %) | <0.03 | — | — |

Example 1: Defoamer compositions were prepared by mixing silica particles into DCRs in different amounts as in Table 2.

Example 2: Defoamer compositions were prepared by mixing silicone oil into DCRs in different amounts as in Table 2.

TABLE 2

Components in defoamer compositions

| | DCR-I (wt. %) | DCR-II (wt. %) | DCR-III (wt. %) | Silica (wt. %) | Silicone oil (wt. %) |
|---|---|---|---|---|---|
| Ex. 1a | 99.9 | — | — | 0.1 | — |
| Ex. 1b | 99.8 | — | — | 0.2 | — |
| Ex. 1c | 99.5 | — | — | 0.5 | — |
| Ex. 1d | 99 | — | — | 1 | — |
| Ex. 1e | 98.1 | — | — | 1.9 | — |
| Ex. 1f | 96.2 | — | — | 3.8 | — |
| Ex. 1g | 94.4 | — | — | 5.6 | — |
| Ex. 1h | 96 | — | — | 4 | — |
| Ex. 1i | — | 96 | — | 4 | — |
| Ex. 1j | — | — | 96 | 4 | — |
| Ex. 2a | 90 | — | — | — | 10 |
| Ex. 2b | 80 | — | — | — | 20 |
| Ex. 2c | 70 | — | — | — | 30 |
| Ex. 2d | 0 | — | — | — | 100 |

Example 3: A surfactant solution was prepared by adding 2 grams of polyoxyethylene stearate and 2 grams of sorbitane monostearate in 100 grams of deionized (DI) water. Defoamer compositions in the form of emulsions were prepared by separately mixing 8 grams of the surfactant solution with 3 grams of each of the defoamer composition of examples 1h, 1i, and 1j to obtain compositions 3h, 3i, and 3j.

Example 4: Effect of defoamer compositions was evaluated as follows. 15 grams of bis(2-ethylhexyl) sulfosuccinate sodium (AOT) or 20 grams of cetyl trimethylammonium bromide (CTAB) in water with the concentration of 10 mM, termed as a surfactant solution, was added to a 100 ml graduated cylinder. Cylinder was fully filled with foam by shaking the cylinder manually and the foam height was measured. After 1 minute, a first photograph was taken to observe stability of the foam in the cylinder (control photograph). Different amounts of the defoamer composition were added to cylinders and cylinders were shaken again to see the effect of the defoamer composition on the foam generation, the foam height was recorded at this stage. Photograph of cylinders was captured with and without addition of the defoamer composition and shown in FIG. 1.

In the FIGURE, cylinder c-1 is the foaming system without the defoamer composition. Cylinders 1c to 1g depict foam reduction in the foaming system as a result of the addition of defoamer compositions of examples 1c to 1g, in amounts of 0.24 wt. %, 0.17 wt. %, 0.23 wt. %, 0.24 wt. %, and 0.27 wt. %, respectively, based on total weight of the surfactant solution.

Tables 3 and 4 show differences in foam height in the cylinder before and after addition of the defoamer composition (after 1 minute). Table 5 presents foam height measurements as a function of time.

TABLE 3

| Examples | Amount of DCR (wt. %) | Surfactant solution made from surfactant (for defoamer test): | Foam height (in %) |
|---|---|---|---|
| Control (c-1) | 0 | AOT | 100 |
| Olive oil | 0.23 | AOT | 100 |
| DCR-I | 0.24 | AOT | 96 |
| DCR-II | 0.34 | AOT | 100 |
| DCR-III | 0.22 | AOT | 40 |
| Control (c-2) | 0 | CTAB | 100 |
| Olive oil | 0.24 | CTAB | 100 |
| DCR-I | 0.14 | CTAB | 73 |
| DCR-II | 0.27 | CTAB | 42 |
| DCR-III | 0.50 | CTAB | 45 |

TABLE 4

| Examples | Amount of defoamer composition added in surfactant solution (wt. %) | Surfactant solution made from surfactant (for defoaming test): | Foam height (in %) |
|---|---|---|---|
| Control (c-1) | 0 | AOT | 100 |
| Ex. 1a | 0.29 | AOT | 43 |
| Ex. 1b | 0.24 | AOT | 39 |
| Ex. 1c | 0.24 | AOT | 51 |
| Ex. 1d | 0.17 | AOT | 42 |
| Ex. 1e | 0.23 | AOT | 41 |
| Ex. 1f | 0.24 | AOT | 57 |
| Ex. 1g | 0.27 | AOT | 64 |
| Ex. 2a-AOT | 0.28 | AOT | 46 |
| Ex. 2b-AOT | 0.19 | AOT | 59 |
| Ex. 2c-AOT | 0.35 | AOT | 38 |
| Ex. 2d-AOT | 0.31 | AOT | 98 |
| Ex. 2a-CTAB | 0.17 | CTAB | 39 |
| Ex. 2b-CTAB | 0.26 | CTAB | 30 |
| Ex. 2c-CTAB | 0.14 | CTAB | 36 |
| Ex. 2d-CTAB | 0.39 | CTAB | 55 |

TABLE 5

| | | Ex. 3h | Ex. 3i | Ex. 3j |
|---|---|---|---|---|
| Amount of defoamer composition added in surfactant solution (wt. %) | | 0.26 | 0.29 | 0.25 |
| Surfactant solution made from surfactant (for defoamer test): | | AOT | AOT | AOT |
| Foam height (in %) measured after time t (min.): | t = 0 | 100 | 100 | 100 |
| | t = 1 | 78 | 83 | 73 |
| | t = 2 | 69 | 72 | 68 |
| | t = 3 | 65 | 69 | 64 |
| | t = 4 | 62 | 64 | 56 |
| | t = 5 | 38 | 40 | 49 |

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method of defoaming a system subject to foaming, comprising:
    treating the system with 0.001 to 10 wt. % of a defoamer composition, based on total weight of the system;
    wherein the defoamer composition comprises:
        (a) 80 to 100 wt. % of a decarboxylated rosin acid (DCR) having a density of 0.9 to 1.0 g/cm$^3$, a flash point of 135 to 175° C., an acid value of <50 mg KOH/g, measured according to ASTM D465, and a viscosity of 15 to 60 cSt at 40° C., measured according to ASTM D-445; and
        (b) 0 to 20 wt. % based on total weight of the defoamer composition of at least a component selected from the group consisting of nanoparticles, surfactants, hydrophobic compounds, and mixtures thereof; and
    wherein the defoamer composition reduces a foam content by at least 20 volume % relative to the system without the defoamer composition.

2. The method of claim 1, wherein the DCR comprises: one or more C═C groups; and 40 to 100 wt. % of tricyclic compounds having 18 to 20 carbon atoms, based on total weight of the DCR.

3. The method of claim 2, wherein sum of tricyclic compounds as aromatic and cycloaliphatic in the DCR is >50 wt. %, based on total weight of the DCR.

4. The method of claim 2, wherein the DCR comprises tricyclic cycloaliphatic compounds in an amount of >15 wt. %, based on total weight of the DCR.

5. The method of claim 1, wherein the nanoparticle is selected from the group consisting of silica, zirconium dioxide, aluminum oxide, cerium oxide, tin oxide, titanium dioxide, and mixtures thereof.

6. The method of claim 1, wherein the surfactant is selected from the group consisting of anionic, cationic, non-ionic, amphoteric, and mixtures thereof.

7. The method of claim 1, wherein the hydrophobic compound is selected from the group consisting of polyethylene wax, carnauba wax, spermaceti, beeswax, lanolin, vaseline, microcrystalline wax, ceresin, squalene, pristan, polyglycerol fatty acid ester, $C_{14}$ to $C_{22}$ alkyl polypentoside, hydrophobic clay, diisopropyl sebacate, octyl isononanoate, isodecyl octanoate, diethylene glycol, isopropyl myristate, isocetyl palmitate, isopropyl isostearate, isocetyl palmitate, isostearyl palmitate, diisostearyl malate, diglyceryl isostearate, diisopropyl dimerate, diglyceryl diisostearate, polyamide particles, silicone oil, and mixtures thereof.

8. The method of claim 1, wherein the DCR has at least one of: a density of 0.92 to 0.98 g/cm³; an acid value of 0.4 to 40 mg KOH/g; and a flash point of 140 to 175° C.

9. The method of claim 1, wherein the DCR has a viscosity of 20 to 50 cSt, according to ASTM D-445, measured at 40° C.

10. The method of claim 1, wherein the DCR has at least one of: an aniline point of 3 to 40° C., measured according to ASTM D611; a pour point of −40 to +10° C., measured according to ASTM D97; and a boiling point of 200 to 390° C., measured according to D2887.

11. The method of claim 1, wherein the DCR has at least one of: a Gardner Color of 0 to 12.0, measured according to ASTM D6166.

12. The method of claim 1, wherein the DCR has a sulfur content of <0.05 wt. %, measured according to ASTM D5453.

13. The method of claim 1, wherein the DCR has a volatile organic content (VOC) of <5 wt. %.

14. The method of claim 1, wherein the DCR has a surface tension of 25 to 50 dynes/cm, measured according to ASTM D1331.

15. The method of claim 1, wherein the defoamer composition comprises: 90 to 99.90 wt. % of the DCR, and 0.1 to 10 wt. % of at least one component selected from the group consisting of nanoparticles, surfactants, hydrophobic compounds, and mixtures thereof, based on total weight of the defoamer composition.

16. The method of claim 1, wherein the at least a component comprises nanoparticles and surfactants, and wherein the defoamer composition comprises: 80 to 99.80 wt. % of the DCR, 0.1 to 10 wt. % of the nanoparticles, and 0.1 to 10 wt. % of the surfactants, based on total weight of the defoamer composition.

17. The method of claim 1, wherein the defoamer composition further comprises at least one additive selected from the group consisting of metallic soaps, unsaponifiable material, freezing point suppressant, cloud point suppressant, diluents, stabilizers, rheology modifiers, metal stearates, biocides, preservatives, extreme pressure (EP) additives, anti-wear additives, corrosion inhibitors, metal deactivators, deodorants, anti-oxidants, dyes, viscosifiers, polymers, resins, plasticizers, redox couples, fillers, fibers, flame retardants, deaerators, pigments, colorants, flow modifiers, drip retardants, anti-blocking agents, anti-static agents, anti-microbial agents, processing aids, pH control agents, thickening agents, binders, and mixtures thereof.

18. The method of claim 1, wherein the defoamer composition is in the form of suspension, dispersion, emulsion, solution, or sol.

19. The method of claim 1, wherein the defoamer composition has an acid value of 0.1 to 10.

20. The method of claim 1, wherein the system subject to foaming is selected from the group consisting of finishing baths for textile materials, fiber suspensions in paper manufacture, paper coating compositions, paints, coatings, waterborne adhesives, inks, polymer latexes, metalworking fluids, and wastewater plants.

* * * * *